Oct. 23, 1945. C. MILLER ET AL 2,387,599
SWIVEL
Original Filed Jan. 11, 1943
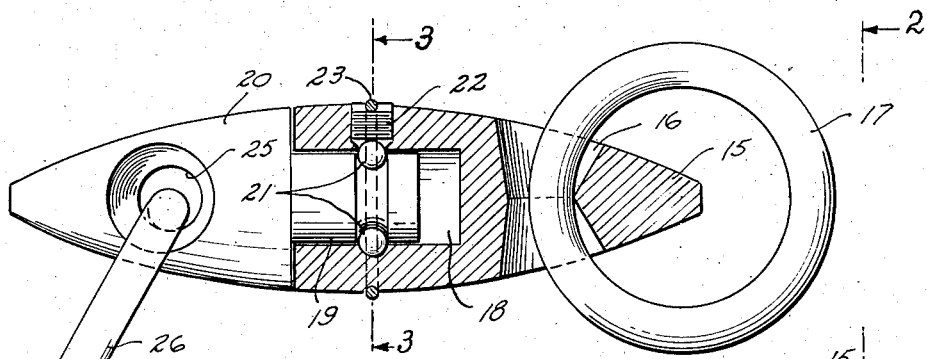
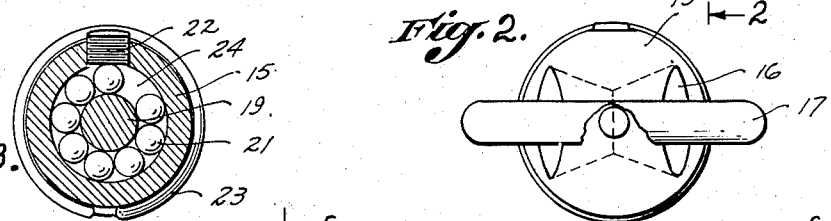
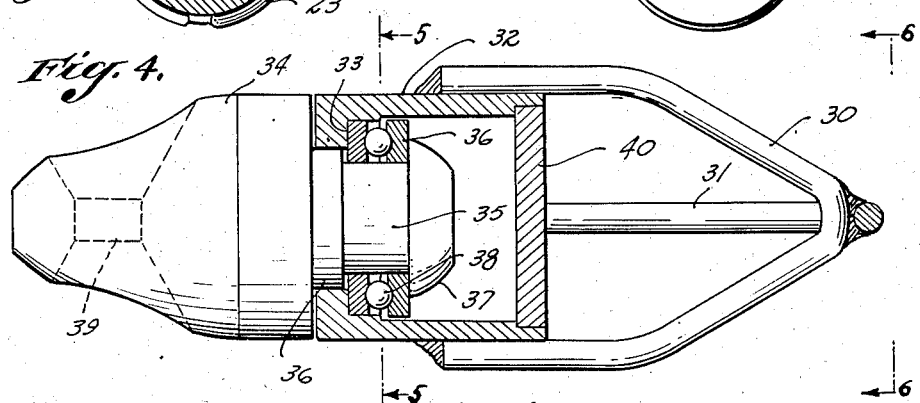
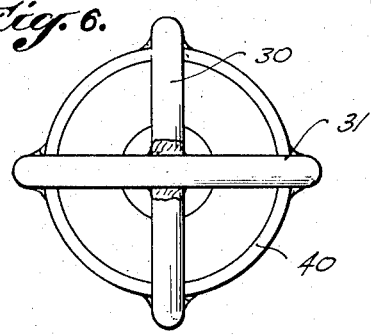
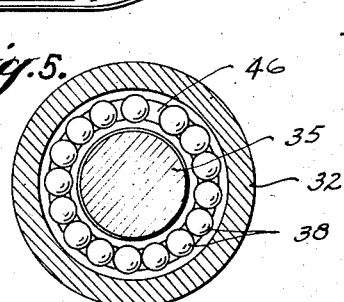
INVENTORS
Cecil Miller,
George W. Tippie,
BY
Robert W. Fulwider
ATTORNEY Patented Oct. 23, 1945

2,387,599

UNITED STATES PATENT OFFICE 2,387,599

SWIVEL

Cecil Miller and George W. Tippie, Pomona, Calif.

Original application January 11, 1943, Serial No. 471,990. Divided and this application November 8, 1943, Serial No. 509,429

1 Claim. (Cl. 287—91)

Our invention relates generally to swivels, and particularly to swivels which are exceptionally free-running, and not subject to periodic sticking or other failure. In this connection it is an object of our invention to provide a novel swivel which is peculiarly well fitted for use with glider-launching apparatus, and which assures a high degree of safety in the operation thereof.

It is also an object of our invention to provide swiveling means which has a minimum of moving parts and in which the bearings are adequately protected from dirt and other foreign substances which might obstruct the rotation of the respective parts of the swivel.

A further object of our invention is to provide a swivel which is exceptionally sturdy and which can stand very rough treatment without ill effects.

This application is a division of our copending application Serial No. 471,990 filed January 11, 1943, and entitled "Glider launching winch."

Other objects and advantages of our invention will become apparent from the following description of preferred forms thereof, and from the accompanying drawing in which:

Fig. 1 is a side elevation partially in section of one form of swivel embodying our invention, Fig. 2 is an end elevation of the swivel of Fig. 1, Fig. 3 is a vertical cross-section of said swivel taken on the line 3—3 of Fig. 1, Fig. 4 is a side elevation of a modified form of swivel embodying our invention, Fig. 5 is a vertical cross-section thereof taken on the line 5—5 of Fig. 4, and Fig. 6 is an end elevation of the swivel of Fig. 5.

Referring now to the drawing, and particularly to Figs. 1, 2 and 3 thereof, the numeral 15 indicates a semi-ellipsoidal female member provided with an aperture 16 through which a ring 17 is inserted. The inner end of the member 15 is provided with a bore 18 adapted to receive the extended cylindrical portion or hub 19 of a male member 20. The hub 19 is provided with an external annular groove which faces a complemental internal annular groove in the bore 18 when the swivel is in the assembled position shown in Fig. 1. A hole is bored in the annular wall surrounding the bore 18 through which a plurality of ball bearings may be dropped into the race 24 formed by the complemental annular grooves in the male and female members of the swivel. By placing the balls 21 in said race, the member 20 is securely locked to the member 15 but is freely rotatable therein to permit full swiveling action. The entrance hole for the balls is preferably tapped and a plug 22 is screwed therein to prevent the balls from coming out of their race.

To securely lock the plug 22 in place, a diametral groove is made in its outer face and an annular groove is made around the outside portion of the body member 15 so that a lock wire 23 can be clamped around the swivel in the grooves and securely lock the assembly in position. An aperture 25 may be provided in the outer end of the male member 20 to accommodate an attaching ring 26, as indicated. By this construction we provide a very rigid swivel which meets all of the necessary strength requirements but at the same time is so freely rotatable as to completely obviate any possibility of failure in that regard.

Referring now to Figs. 4-6, wherein a modified form of swivel is shown, the numerals 30 and 31 indicate coupling rings fastened to a cylindrical female member 32 which is counterbored to provide a shoulder 33. The male member 34 of the swivel has an axial hub 35 provided with a circular shoulder 36 at its base. In assembling the swivel, the hub 35 is inserted into the cylinder 32 and a bearing 46 is placed thereon and caused to bear against the shoulder 33 of the cylindrical body portion. The end 37 of the hub 35 is then peened over to securely retain the bearing between it and the shoulder 33, thus permitting the male member 34 to rotate freely within the cylindrical portion 32 of the female member by reason of the ball bearings 38. The male end of the swivel may also be provided with an aperture 39 through which a coupling ring may be inserted. If desired, a plate 40 may be fastened over the open end of the cylinder 32 to prevent the accumulation of dirt therein.

It will thus be seen that our modified form also provides a strong and durable swivel which is free-floating and therefore particularly adaptable for glider launching use.

While the forms of our invention herein illustrated and described are fully capable of attaining the objects and providing the advantages stated, it is to be understood that they are merely illustrative of our invention, and we do not mean to be limited thereto except as set forth in the appended claim.

We claim:

A swivel of the character described, which includes: a male member having a hub projecting therefrom and provided with a shoulder at its base and a shoulder on its outer end; a female member receiving said hub and provided with a shoulder at its outer end which surrounds the inner shoulder of said hub; and an annular ball bearing mounted on said hub between its two shoulders with its opposite faces bearing on the outer shoulder of the hub and the outer shoulder of the female member respectively.

CECIL MILLER.
GEORGE W. TIPPIE.